(12) United States Patent
Assam

(10) Patent No.: US 9,744,905 B1
(45) Date of Patent: Aug. 29, 2017

(54) SYSTEMS AND METHODS FOR NOTIFICATION OF EXCEEDING SPEED LIMITS

(71) Applicant: State Farm Mutual Automobile Insurance Company, Bloomington, IL (US)

(72) Inventor: Lee Assam, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 15/082,529

(22) Filed: Mar. 28, 2016

Related U.S. Application Data

(60) Provisional application No. 62/248,471, filed on Oct. 30, 2015.

(51) Int. Cl.
*B60Q 9/00* (2006.01)
*B60Q 1/54* (2006.01)

(52) U.S. Cl.
CPC ..................................... *B60Q 9/00* (2013.01)

(58) Field of Classification Search
CPC . B60Q 9/00; B60Q 1/54; B60Q 9/008; G08G 1/00; G08G 1/052; G08G 1/0967; G06F 19/00; H04L 43/16; H04W 84/042; H04W 88/02; B60R 2300/302
USPC .... 340/441, 466, 467, 905; 701/408, 428, 8, 701/38; 382/104, 172
See application file for complete search history.

(56) References Cited

U.S. PATENT DOCUMENTS

| | | | |
|---|---|---|---|
| 6,861,970 B1 | 3/2005 | Garland | |
| 7,234,564 B2 | 6/2007 | Farrelly et al. | |
| 7,589,643 B2 | 9/2009 | Dagci et al. | |
| 7,946,271 B2 | 5/2011 | Gregorio | |
| 8,063,754 B2 | 11/2011 | Tanida et al. | |
| 8,248,270 B2 | 8/2012 | Nieves | |
| 8,290,697 B2 | 10/2012 | Coughlin | |
| 8,299,905 B2 * | 10/2012 | King | G08B 6/00 340/407.1 |
| 8,364,392 B2 * | 1/2013 | Chao | G01C 21/3697 340/441 |
| 9,129,460 B2 | 9/2015 | Mcclellan et al. | |
| 9,536,426 B2 * | 1/2017 | Schmitt | G08G 1/052 |
| 2009/0076700 A1 * | 3/2009 | Radpour | G07C 5/008 701/93 |
| 2011/0187522 A1 | 8/2011 | Filev et al. | |

(Continued)

*Primary Examiner* — Hung T Nguyen
(74) *Attorney, Agent, or Firm* — Armstrong Teasdale LLP

(57) ABSTRACT

A wearable device is provided that includes a receiver, a processor, and a transducer. The receiver is configured to receive speed limit data indicative of a posted speed limit corresponding to a route or road upon which the wearable device is traveling. The processor is configured to compare the speed limit to a current speed of the wearable device and/or a vehicle in which the user wearing the wearable device is driving. The transducer is configured to deliver a haptic or other notification to a user upon which the wearable device is worn when the current speed exceeds the speed limit or exceeds the speed limit by a predetermined amount. As a result, safer driving and vehicle collision avoidance may be facilitated. Safe driving auto insurance discounts may be provided to drivers that use the safe driving or speed limit warning functionality discussed herein.

20 Claims, 7 Drawing Sheets

(56) References Cited

U.S. PATENT DOCUMENTS

| | | |
|---|---|---|
| 2012/0218091 A1 | 8/2012 | Rothschild |
| 2016/0034764 A1* | 2/2016 | Connor .............. G06K 9/00771 348/158 |
| 2016/0185291 A1* | 6/2016 | Chamberlin ............. B60Q 9/00 701/70 |
| 2017/0032168 A1* | 2/2017 | Kim ................... G06K 9/00013 |

* cited by examiner

SYSTEMS AND METHODS FOR NOTIFICATION OF EXCEEDING SPEED LIMITS

CROSS-REFERENCE TO RELATED APPLICATIONS

This application claims the benefit of priority of U.S. Provisional Patent Application Ser. No. 62/248,471, filed Oct. 30, 2015, the contents of which are hereby incorporated by reference, in its entirety and for all purposes, herein.

FIELD OF THE INVENTION

The present disclosure relates to driver awareness and, more particularly, to systems and methods for providing feedback to a driver when speed limits are exceeded.

BACKGROUND

Driver awareness is an important aspect of automobile safety. Vehicles are often equipped with various sensors and alert systems to increase the driver's level of awareness. Such features may include lane departure sensors, for example, that detect when the vehicle may be close to or over the painted lines on the road. Once detected, the driver may be notified of the lane departure by the vehicle through an indicator on the dashboard, a heads-up display, or a vibration in the seat, for example. This level of awareness may allow the driver to correct course and minimize risk of an automobile accident.

Automobile accidents may impact a driver's auto insurance. A driver having been in one or more accidents may indicate the driver's elevated risk of future automobile accidents. In the auto insurance industry, riskier drivers cost more to insure than less risky drivers. Accordingly, driver awareness and accident prevention reduce costs for the insurer as well as the insured driver by reducing the probability an accident will occur that requires payment by the insurer, and by reducing auto insurance premiums for the insured driver.

Excessive speeds may be a factor in at least some automobile accidents. Excessive speeds may be evaluated by comparing a current speed of a vehicle to a posted speed limit for a given road or other path of travel. A driver who maintains speeds at or below the speed limit may be less likely to be involved in an automobile accident. Most modern vehicles display the current speed to the driver in one or more ways, for example, on an analog dashboard speedometer or a digital speedometer. Such feedback allows the driver to control speed according to his knowledge of the speed limit and varying road conditions. The driver's appropriate control of speed may reduce his risk of being in an automobile accident that may ultimately increase his costs as an insured driver, as well as the insurer's costs in insuring the driver. By controlling speed and reducing risk, the driver may be able to reduce costs of auto insurance.

BRIEF SUMMARY

The present embodiments may relate to systems and methods for providing feedback to a driver when speed limits are exceeded, including haptic notification of excessive speeds. Haptic notification may be provided through a transducer that translates an electrical signal into a physical response, such as, for example, a vibration or pressure. The systems and methods introduced herein provide haptic notification to a driver through a notification device, such as, for example, a wearable device such as a smart watch. Such a notification device may gain access to speed limit information, as well as current speed information, the two of which are compared to generate a control signal for the haptic notification. Further, the systems and methods introduced herein may vary the delivery and intensity of the haptic notification according to the extent the speed limit is exceeded. For example, haptic notification may first be provided once the current speed of travel exceeds the speed limit by some predetermined threshold. In certain embodiments, the intensity of the haptic notification may increase and decrease, respectively, as the speed limit is increasingly or decreasingly exceeded. For example, a more intense haptic notification may be delivered to the user when exceeding the speed limit by 30 miles per hour (MPH), as compared to exceeding the speed limit by 5 MPH.

In one aspect, a wearable device may be provided. The wearable device may include a receiver, a processor, and a transducer. The receiver may be configured to receive speed limit data indicative of a speed limit corresponding to a path upon which the wearable device is traveling. The processor may be configured to compare the speed limit to a current speed of the wearable device. The transducer may be configured to deliver a haptic notification to a user upon which the wearable device may be worn when the current speed exceeds the speed limit. As a result, safer driving and vehicle collision avoidance may be facilitated. Safe driving auto insurance discounts may be provided to drivers that use the safe driving or speed limit warning functionality (and/or wearable devices) discussed herein.

In another aspect, a method of providing notification of exceeding a speed limit may be provided. The speed limit corresponds to a path upon which a notification device is traveling. The method may include (1) receiving speed limit data indicative of the speed limit at a receiver, (2) receiving, at a processor, a current speed at which the notification device is traveling upon the path for comparison to the speed limit, (3) transmitting a notification signal from the processor to a transducer when the current speed exceeds the speed limit (and/or exceeds the speed limit by a pre-determined threshold, such as 5 mph), and/or (4) delivering, by the transducer according to the notification signal, a haptic notification to a user of the notification device. As a result, safer driving and vehicle collision avoidance may be facilitated.

In another aspect, a computer-implemented method of providing posted speed limit warnings is provided. The method includes receiving, via one or more local or remote processors (and/or transceivers), a current speed of a vehicle (such as a speed generated by one or more vehicle-mounted sensors, wearable-device sensors, or mobile device-mounted sensors—the sensors may be accelerometers, gyroscopes, GPS receivers (using GPS speed and other information), speedometers, speed sensors, or other speed-related sensors) via wired or wireless communication either directly or indirectly from a speed-related sensor. The method further includes receiving, via the one or more local or remote processors (and/or transceivers), GPS location information of the vehicle and/or road or route information that the vehicle is currently traveling (such as from GPS unit mounted on the vehicle, in a vehicle navigation system, or on a mobile device or wearable device); determining, via the one or more local or remote processors, a posted speed limit based upon the GPS location information of the vehicle and/or the road or route information that the vehicle is currently traveling; comparing, via the one or more local or remote processors, the current speed of a vehicle with the posted speed limit determined; and/or if or when the current speed exceeds the posted speed limit by a predetermined threshold, generating, via the one or more local or remote processors, a haptic or other warning to the driver to slow down to facilitate safer driving and vehicle collision avoidance.

In another aspect, a computer system for providing posted speed limit warnings is provided. The computer system includes one or more local or remote processors and/or transceivers configured to: receive (or otherwise determine) a current speed of a vehicle (such as a speed generated by one or more vehicle-mounted sensors, wearable-device sensors, or mobile device-mounted sensors—the sensors may be accelerometers, gyroscopes, GPS receivers (using GPS speed and other information), speedometers, speed sensors, or other speed-related sensors) via wired or wireless communication either directly or indirectly from a speed-related sensor. The computer system further includes one or more local or remote processors and/or transceivers configured to: receive GPS location information of the vehicle and/or road or route information that the vehicle is currently traveling (such as from GPS unit mounted on the vehicle, in a vehicle navigation system, or on a mobile device or wearable device); determine a posted speed limit based upon the GPS location information of the vehicle and/or the road or route information that the vehicle is currently traveling; compare the current speed of a vehicle with the posted speed limit determined; and/or if or when the current speed exceeds the posted speed limit by a predetermined threshold, generate a haptic or other warning to the driver to slow down to facilitate safer driving and vehicle collision avoidance.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
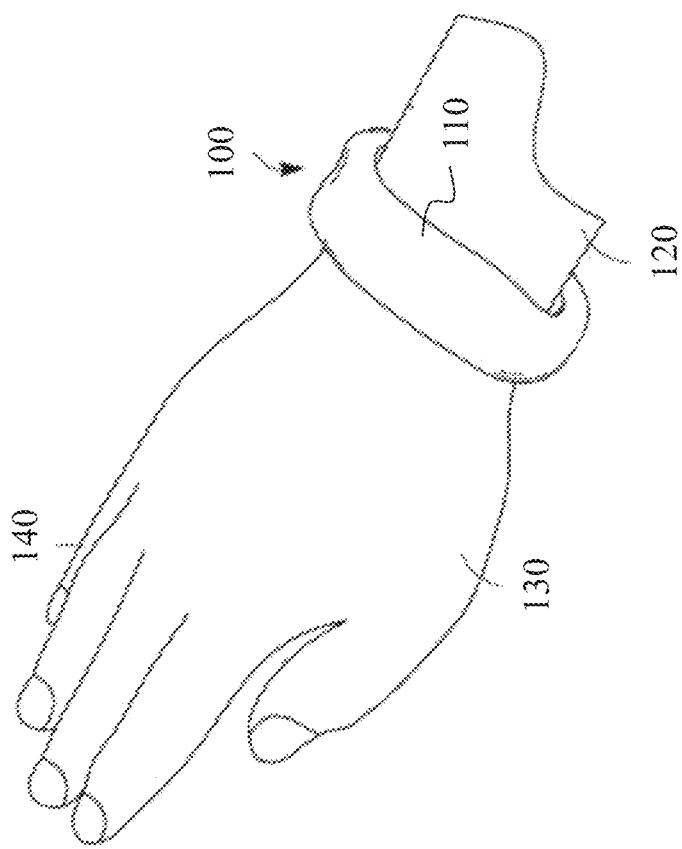
FIG. 1 depicts an exemplary wearable device for providing haptic notification of excessive speeds.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for providing feedback to a driver when speed limits are exceeded, including haptic notification of excessive speeds. Haptic notification may be provided through a transducer that translates an electrical signal into a physical response, such as, for example, a vibration or pressure. The systems and methods introduced herein provide haptic notification to a driver through a notification device, such as, for example, a wearable device such as a smart watch or other wearable electronics. Such a notification device may gain access to speed limit information, as well as current speed information, and may compare the two speeds and generate a control signal for the haptic notification.

Further, the systems and methods introduced herein may vary the delivery and intensity of the haptic notification according to the extent the speed limit is exceeded. For example, haptic notification may first be provided once the current speed of travel exceeds the speed limit by some predetermined threshold. In certain embodiments, the intensity of the haptic notification may increase and decrease, respectively, as the speed limit is increasingly or decreasingly exceeded. For instance, a more intense haptic notification is delivered to the wearer when exceeding the speed limit by 20 or 30 miles per hour (MPH), as compared to exceeding the speed limit by 5 MPH.

At least one of the technical problems addressed by this system may include: (i) a lack of knowledge of posted or otherwise appropriate speed limits (such as when driving or traveling through unfamiliar areas or cities); (ii) a lack of awareness of current speed of travel relative to the speed limit; (iii) an inability of a vehicle to provide appropriate notification to a driver of excessive speeds; (iv) an increased risk of being involved in an automobile accident due to excessive speeds; and/or (v) increased costs of auto insurance due to vehicle collisions or other accidents in which excessive speeds are a factor.

A technical effect of the systems and processes described herein may be achieved by performing at least one of the following steps: (a) receiving speed limit data indicative of the speed limit at a receiver of a notification device; (b) receiving the current speed at which a notification device is traveling along a path; (c) comparing the current speed to the speed limit; (d) transmitting a notification signal to a transducer in the notification device when the current speed exceeds the speed limit; and/or (e) delivering, by the transducer according to the notification signal, a haptic notification to a user of the notification device.

The technical effect achieved by this system may be at least one of: (i) improving driver awareness of posted or otherwise appropriate speed limits; (ii) providing haptic notification to a driver through a notification device when current speed exceeds the speed limit; (iii) reducing a driver's risk of being involved in an automobile accident by notifying the driver of excessive speeds; (iv) reducing auto insurance costs for the driver by encouraging maintaining speeds at or below the speed limit; and (v) reducing auto insurance costs for an insurer by improving driver awareness and thereby reducing the occurrence of automobile accidents.

Exemplary Wearable Device

FIG. 1 depicts an exemplary wearable device 100 for providing haptic notification of excessive speeds. Wearable device 100 includes a band 110 configured to be worn around a wrist 120 of a user 130. In certain embodiments, wearable device 100 may include a watch, a smart watch, a fitness tracker, or other device configured to be worn upon wrist 120 of user 130.

In alternative embodiments, wearable device 100 may be configured to be worn upon a finger 140 of user 130, similar to a ring. In other embodiments, wearable device 100 may be configured to be worn on user's 130 head or face, such as, for example, smart glasses or an earpiece. In other embodiments, wearable device 100 may be configured to be worn around the neck of user 130, upon a belt or waistband of user 130, upon a zipper-pull, upon a draw-string, in a pant, shirt, or coat pocket, or any other suitable manner of wearing wearable device 100.

Figure 2:
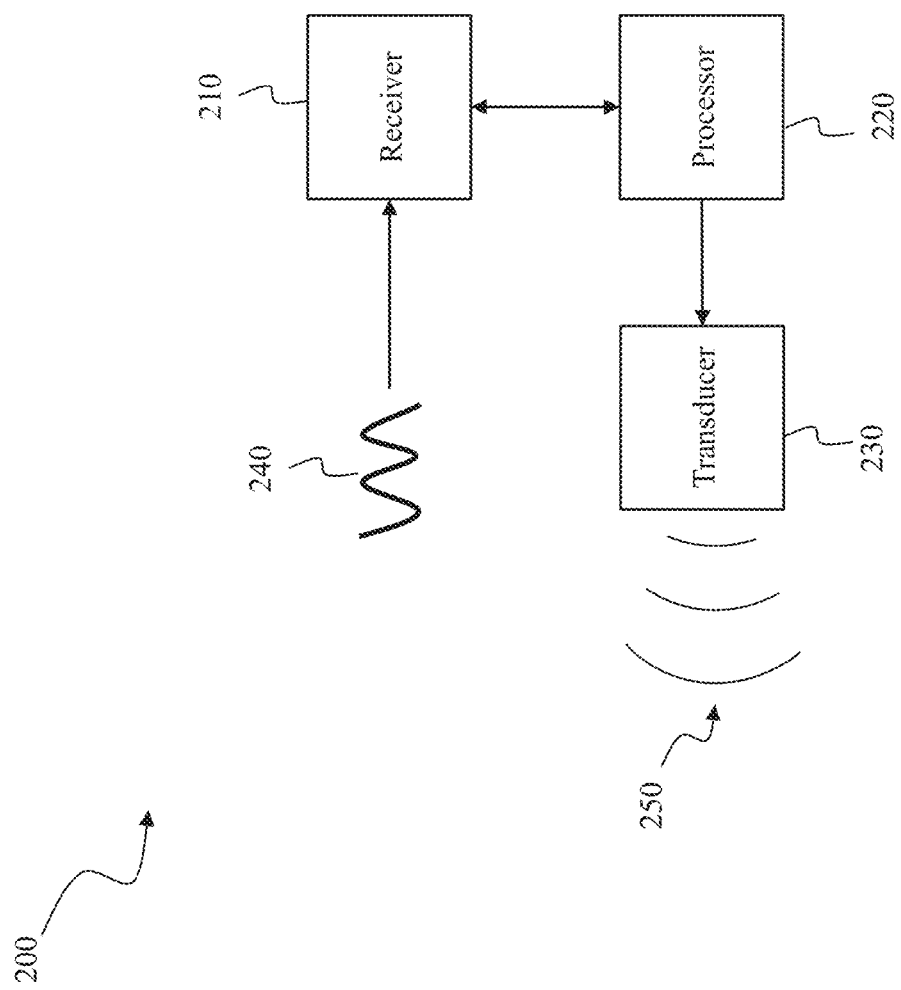
FIG. 2 depicts a block diagram of an exemplary notification device for providing haptic notification of excessive speeds.

FIG. 2 depicts a block diagram of an exemplary notification device 200, such as wearable device 100, shown in FIG. 1, for providing haptic notification of excessive speeds. Notification device 200 may include a wearable device, a mobile computing device, a vehicle, or any other computing system suitable for travel with a user and capable of providing haptic notification to the user. For example, notification device 200 may include a smart phone carried in a pocket of the user. Notification device 200 may include a receiver 210, a processor 220, and a transducer 230.

Receiver 210 may be configured to receive a signal 240. Signal 240 may be indicative of a speed limit for a path upon which a user of notification device 200 is traveling. Signal 240 carries speed limit data that represents the speed limit. In certain embodiments, receiver 210 may be a global positioning system (GPS) receiver and signal 240 may be a GPS signal including the speed limit. In other embodiments, receiver 210 may be a radio frequency (RF) receiver configured to receive signal 240 as a cellular signal from a cellular tower.

In certain embodiments, receiver 210 may be configured to receive signal 240 from the vehicle in which notification device 200 and the user are traveling. For example, receiver 210 may be a Bluetooth receiver configured to receive the speed limit data from a vehicle. The vehicle may be configured to observe the speed limit itself, or may be configured to receive speed limit data from a GPS connection, or any other suitable third party service.

Receiver 210, in certain embodiments, may receive another signal that indicates the current speed of notification device 200. For example, where receiver 210 is a GPS receiver, receiver 210 may receive another GPS signal indicating the current speed based upon GPS triangulation. In certain embodiments, receiver 210 is further configured to receive current speed information from the vehicle in which notification device 200 and the user are traveling. For example, receiver 210 may include a Bluetooth receiver configured to receive a signal from the vehicle including the current speed information as determined by the vehicle's native speedometer, or any other suitable system for determining the current speed.

Receiver 210, in certain embodiments, may receive signals indicative of additional travel hazards, including, for example, blocked roads, accidents, construction, or speed zones.

Processor 220 may be coupled to receiver 210 and may be configured to receive the speed limit data from receiver 210. Processor 220 may be further configured to receive information indicating the current speed of notification device 200. In certain embodiments, processor 220 may be coupled to a sensor, such as, for example, an accelerometer or other suitable speed measuring device. The sensor may detect the current speed at which notification device 200 is traveling and generate a current speed signal that is receivable by processor 220. Thus, if notification device 200 is being worn by the user, while the user is located inside a moving vehicle, notification device 200 would be able to determine the current speed of the vehicle the user is located inside. The speed of the user would equal the speed of the vehicle. In certain embodiments, where receiver 210 is configured to receive information indicating the current speed, the current speed information is received from receiver 210.

Processor 220 may be further configured to compare the speed limit to the current speed. In certain embodiments, processor 220 may compare the current speed to a predetermined threshold above the speed limit. For example, where the speed limit is X, processor 220 may be configured to compare the current speed to X+10, where X+10 is a speed expressed in miles per hour (MPH), kilometers per hour (KPH), or any other suitable unit of measure for speed. The threshold may be predetermined and configurable for a given user of notification device 200.

Transducer 230 may be coupled to processor 220. Transducer 230 may be configured to receive an electrical signal and translate that signal into a physical action 250, such as, for example, a vibration. Physical action 250 may be any action that may serve as a haptic notification to a user of notification device 200. Physical action 250 may, in certain embodiments, vary in intensity according to the received electrical signal. For example, a higher voltage electrical signal may cause transducer 230 to generate a more intense physical action 250, and a lower voltage electrical signal may cause transducer 230 to generate a less intense physical action 250. In alternative embodiments, the electrical signal may have a duty cycle upon which the intensity of physical action 250 is based.

Processor 220 may be further configured to generate an electrical signal to control transducer 230 based upon the comparison of the current speed to the speed limit, or the predetermined threshold above the speed limit. Processor 220 may be configured to cause transducer 230 to deliver a haptic notification to the user of notification device 200. For example, when processor 220 determines the current speed is greater than the speed limit, an electrical signal is transmitted from processor 220 to transducer 230. Transducer 230 is then configured to generate physical action 250. When processor 220 determines the current speed is at or below the speed limit, processor 220 may transmit no signal at all to transducer 230. In an alternative embodiment, when processor 220 determines the current speed is at or below the speed limit, processor 220 may transmit an electrical signal to transducer 230 that causes transducer 230 to not generate physical action 250.

Processor 220 may be further configured to generate an electrical signal to control transducer 230 based upon additional data received by receiver 210 regarding hazards along the path of travel. Processor 220 may be configured to cause transducer 230 to deliver a haptic notification to the user of notification device 200 when a hazard is approaching. For example, a haptic notification may be delivered to the user one mile before a road blockage ahead.

In certain embodiments, processor 220 may be configured to control the intensity of physical action 250 generated by transducer 230. For example, processor 220 may control the intensity of physical action 250 based upon the extent to which the speed limit is exceed by the current speed of notification device 200. When processor 220 determines the current speed exceeds the speed limit by a large magnitude, processor 220 may cause transducer 230 to generate a more intense physical action 250. Conversely, when processor 220 determines the current speed exceeds the speed limit by a small magnitude, processor 220 may cause transducer 230 to generate a less intense physical action 250.

In one embodiment, processor 220 may be configured to generate 100% intensity physical action 250 when the current speed exceeds the speed limit by 10 MPH or more. Further, processor 220 may be configured to generate 5% intensity physical action 250 when the current speed exceeds the speed limit by 5 MPH or less. The precise gradient of intensity of physical action 250 may vary per embodiment, and may further vary per user of notification device 200.

In certain embodiments, where processor 220 is configured to compare the current speed to a predetermined threshold above the speed limit, for example, processor 220 may be configured to cause transducer 230 to generate 0% intensity physical action 250 when the current speed exceeds the speed limit by 5 MPH or less.

Exemplary System

Figure 3:
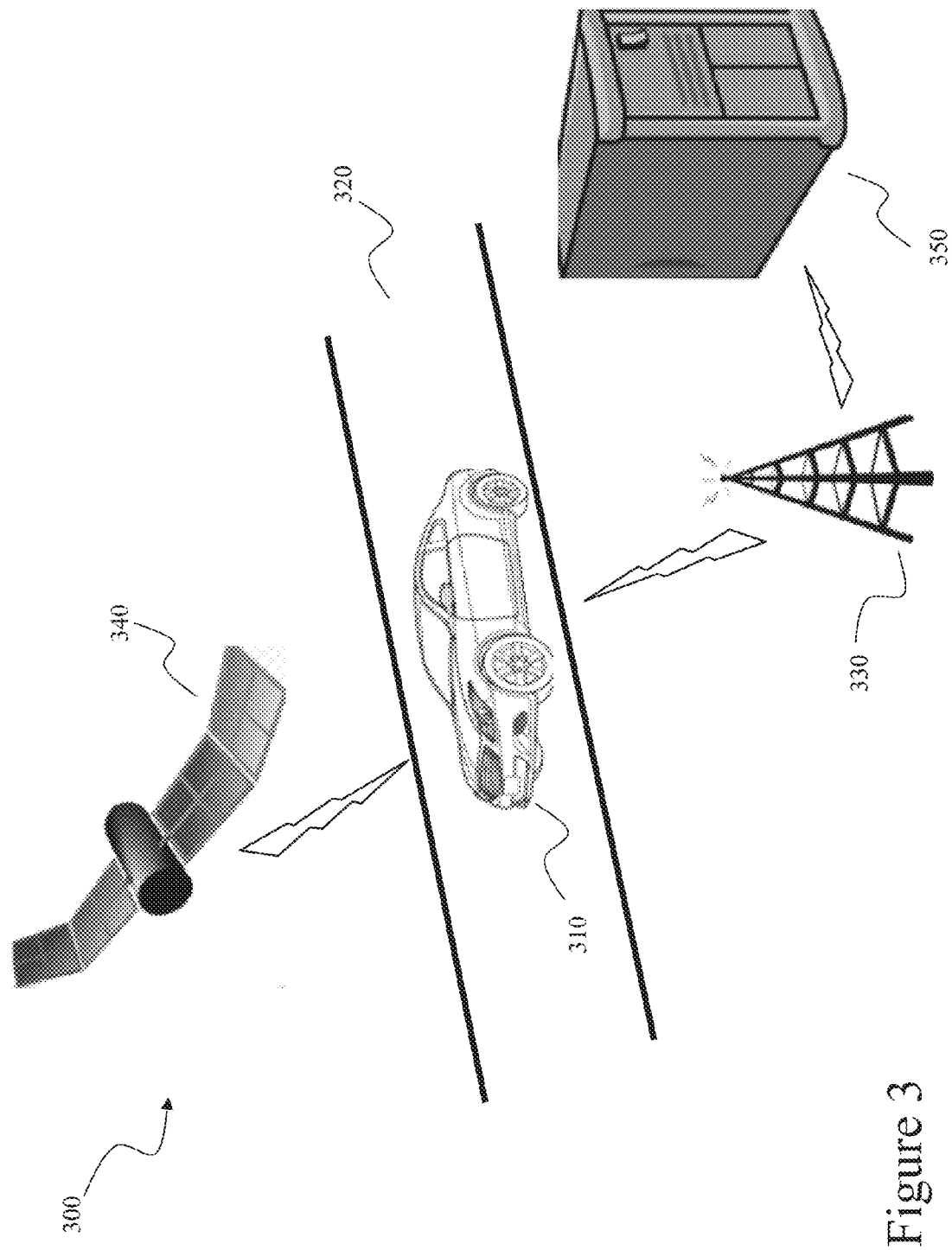
FIG. 3 depicts an exemplary system for communicating speed information to and from a notification device traveling along a path of travel.

FIG. 3 depicts an exemplary system 300 for communicating speed information to and from a notification device, such as wearable device 100, shown in FIG. 1, or notification device 200, shown in FIG. 2. System 300 includes a vehicle 310 traveling along a path 320. Vehicle 310 may be any vehicle suitable to carry a user wearing a wearable device, such as wearable device 100, or notification device 200. In certain embodiments, vehicle 310 may embody notification device 200. Vehicle 310 may include an automobile, a boat, a motorcycle, a recreational vehicle, a bicycle, an all-terrain vehicle, a cart, or other suitable vehicle. In certain embodiments, vehicle 310 may include a detection system configured to observe a posted speed limit. For example, vehicle 310 may include an image capture device, such as a digital camera, that may be configured to capture an image of a speed limit sign as it is passed along path 320. Vehicle 310 may be further configured to extract that observed speed limit and communicate it to the notification device. In certain embodiments, the speed limit observed by vehicle 310 may be used as an override of a speed limit received at a receiver of the notification device. This may be the case, for example, when vehicle 310 is traveling through a construction zone with a reduced speed limit.

Path 320 may include any path suitable for vehicle 310 to travel upon, such as a road, for example. Path 320 is associated with a speed limit expressed in a suitable unit of measure for speed. The speed limit may generally be posted, but may not be visible or known by a user of the notification device.

System 300 may include a cellular tower 330. Cellular tower 330 may be configured to communicate with the notification device using RF signals. Cellular tower 330 may be configured to transmit a signal to the notification device that indicates the speed limit for path 320. In certain embodiments, cellular tower 330 may be configured to transmit another signal to the notification device that indicates the current speed of the notification device and vehicle 310.

System 300 may include a satellite 340. Satellite 340 may be configured to communicate with the notification device. In certain embodiments, satellite 340 may include a GPS satellite configured to transmit GPS signals to a GPS receiver in the notification device. The GPS signal may include speed limit information. In certain embodiments, the GPS signal may also include current speed information.

In certain embodiments, system 300 may include a server 350. Server 350 may be configured to communicate with the notification device using cellular tower 330 or satellite 340, for example. Server 350 may include an insurance server operated and maintained by an auto insurance company. Server 350 may be configured to receive information indicating the current speed of vehicle 310 and the notification device exceeds the speed limit. Server 350 may be further configured to only collect such information when authorized by the user of the notification device. Server 350 may use the information indicating the speed limit was not exceeded, or was exceeded, to modify insurance coverage, price, or discounts such as to facilitate rewarding risk averse drivers and encouraging safe driving.

In an alternative embodiment, server 350 may include a third party service server configured to communicate speed limit information to the notification device. In certain embodiments, the third party service server is configured to collect speed limit information and current speed information for the notification device, for the user, or the vehicle in which both are traveling. Server 350 may be configured to compare the current speed to the speed limit and to communicate a notification signal to the notification device. The notification device may be configured to receive the notification signal and translate it into a haptic notification for the user.

In certain embodiments, server 350 may be configured to only collect speed limit information and current speed information from the user or the notification device if the user agrees to the data collection. Server 350 may be configured to present the user an "opt in" option for the data collection. In certain embodiments, the user may be presented the opt in option in the vehicle, or on a mobile computing device, such as, for example, a smart phone, tablet computer, laptop, or other suitable computing device. For example, in embodiments where server 350 is an insurance server, the insurance company maintaining the insurance server may present the user terms of the collection of speed limit data and current speed data for the purpose of adjusting insurance policies, deductibles, premiums, and discounts.

In one embodiment, any information transmitted and/or stored on server 350 does not include any personally identifiable information (PII), but rather includes analyzed, anonymized, and/or aggregated data that does not specifically identify a user or a user computing device. In other implementations, where server 350 may transmit and/or store PII, any PII is encrypted to prevent access by unauthorized devices. Moreover, in any implementation in which PII may be collected, transmitted, and/or stored, the user from which the PII may be collected is provided an opportunity to agree to or deny collection of such data.

Exemplary Vehicle System

In one embodiment, notification device 200 may include a vehicle, such as vehicle 310, in which the user of notification device 200 is traveling. In such an embodiment, vehicle 310 may include receiver 210, processor 220, and transducer 230, all shown in FIG. 2.

Receiver 210 may be configured to receive signal 240 directly from cellular tower 330 or satellite 340. In certain embodiments, receiver 210 may receive signal 240 from another system on vehicle 310, such as a navigation system or GPS, for example. For example, receiver 210 may be a Bluetooth receiver configured to receive the speed limit data from vehicle 310. In certain embodiments, receiver 210 may be a GPS receiver and signal 240 may be a GPS signal including the speed limit. In other embodiments, receiver 210 may be a radio frequency (RF) receiver configured to receive signal 240 as a cellular signal from a cellular tower. Signal 240 may be indicative of a speed limit for a path upon which vehicle 310 is traveling. Signal 240 carries speed limit data that represents the speed limit. Vehicle 310 may be configured to observe the speed limit itself, or may be configured to receive speed limit data from a GPS connection, or any other suitable third party service.

Receiver 210, in certain embodiments, may receive another signal that indicates the current speed of notification device 200. For example, where receiver 210 is a GPS receiver, receiver 210 may receive another GPS signal indicating the current speed based upon GPS triangulation. In certain embodiments, receiver 210 may be further configured to receive current speed information from vehicle 310. For example, receiver 210 may include a Bluetooth receiver configured to receive a signal from the vehicle including the current speed information as determined by the vehicle's native speedometer, or any other suitable system for determining the current speed.

Processor 220 may be coupled to receiver 210 and may be configured to receive the speed limit data from receiver 210. Processor 220 may be further configured to receive information indicating the current speed of notification device 200. In certain embodiments, processor 220 may be coupled to a sensor, such as, for example, an accelerometer or other suitable speed measuring device. The sensor detects the current speed at which vehicle 310 is traveling and generates a current speed signal that is receivable by processor 220.

Processor 220 may be further configured to compare the speed limit to the current speed. In certain embodiments, processor 220 may compare the current speed to a predetermined threshold above the speed limit. For example, where the speed limit is X, processor 220 may be configured to compare the current speed to X+10, where X+10 is a speed expressed in miles per hour (MPH), kilometers per hour (KPH), or any other suitable unit of measure for speed. The threshold may be predetermined and configurable for a given user of notification device 200.

Transducer 230 may be coupled to processor 220. Transducer 230 may be configured to receive an electrical signal and translate that signal into a physical action 250, such as, for example, a vibration. Physical action 250 may be any action that may serve as a haptic notification to a user of notification device 200. Physical action 250 may, in certain embodiments, vary in intensity according to the received electrical signal. For example, a higher voltage electrical signal may cause transducer 230 to generate a more intense physical action 250, and a lower voltage electrical signal may cause transducer 230 to generate a less intense physical action 250. In alternative embodiments, the electrical signal may have a duty cycle upon which the intensity of physical action 250 is based.

Transducer 230 may be disposed such that physical action 250 provides a haptic notification to the user. In certain embodiments, transducer 230 may be disposed on a steering wheel of vehicle 310. In an alternative embodiment, transducer 230 may be disposed in a seating surface of vehicle 310. In certain embodiments, vehicle 310 may include one or more visual cues indicating the speed limit is exceeded.

Processor 220 may be further configured to generate an electrical signal to control transducer 230 based upon the comparison of the current speed to the speed limit, or the predetermined threshold above the speed limit. Processor 220 may be configured to cause transducer 230 to deliver a haptic notification to the user of vehicle 310. For example, when processor 220 determines the current speed is greater than the speed limit, an electrical signal is transmitted from processor 220 to transducer 230. Transducer 230 is then configured to generate physical action 250. When processor 220 determines the current speed is at or below the speed limit, processor 220 may transmit no signal at all to transducer 230. In an alternative embodiment, when processor 220 determines the current speed is at or below the speed limit, processor 220 may transmit an electrical signal to transducer 230 that causes transducer 230 to not generate physical action 250.

In certain embodiments, processor 220 may be configured to control the intensity of physical action 250 generated by transducer 230. For example, processor 220 may control the intensity of physical action 250 based upon the extent to which the speed limit is exceed by the current speed of notification device 200. When processor 220 determines the current speed exceeds the speed limit by a large magnitude, processor 220 may cause transducer 230 to generate a more intense physical action 250. Conversely, when processor 220 determines the current speed exceeds the speed limit by a small magnitude, processor 220 may cause transducer 230 to generate a less intense physical action 250.

In one embodiment, processor 220 may be configured to generate 100% intensity physical action 250 when the current speed exceeds the speed limit by 10 MPH or more. Further, processor 220 may be configured to generate 5% intensity physical action 250 when the current speed exceeds the speed limit by 5 MPH or less. The precise gradient of intensity of physical action 250 may vary per embodiment, and may further vary per user of vehicle 310.

In certain embodiments, where processor 220 is configured to compare the current speed to a predetermined threshold above the speed limit, for example, processor 220 may be configured to cause transducer 230 to generate 0% intensity physical action 250 when the current speed exceeds the speed limit by 5 MPH or less.

Exemplary Computer-Implemented Method

Figure 4:
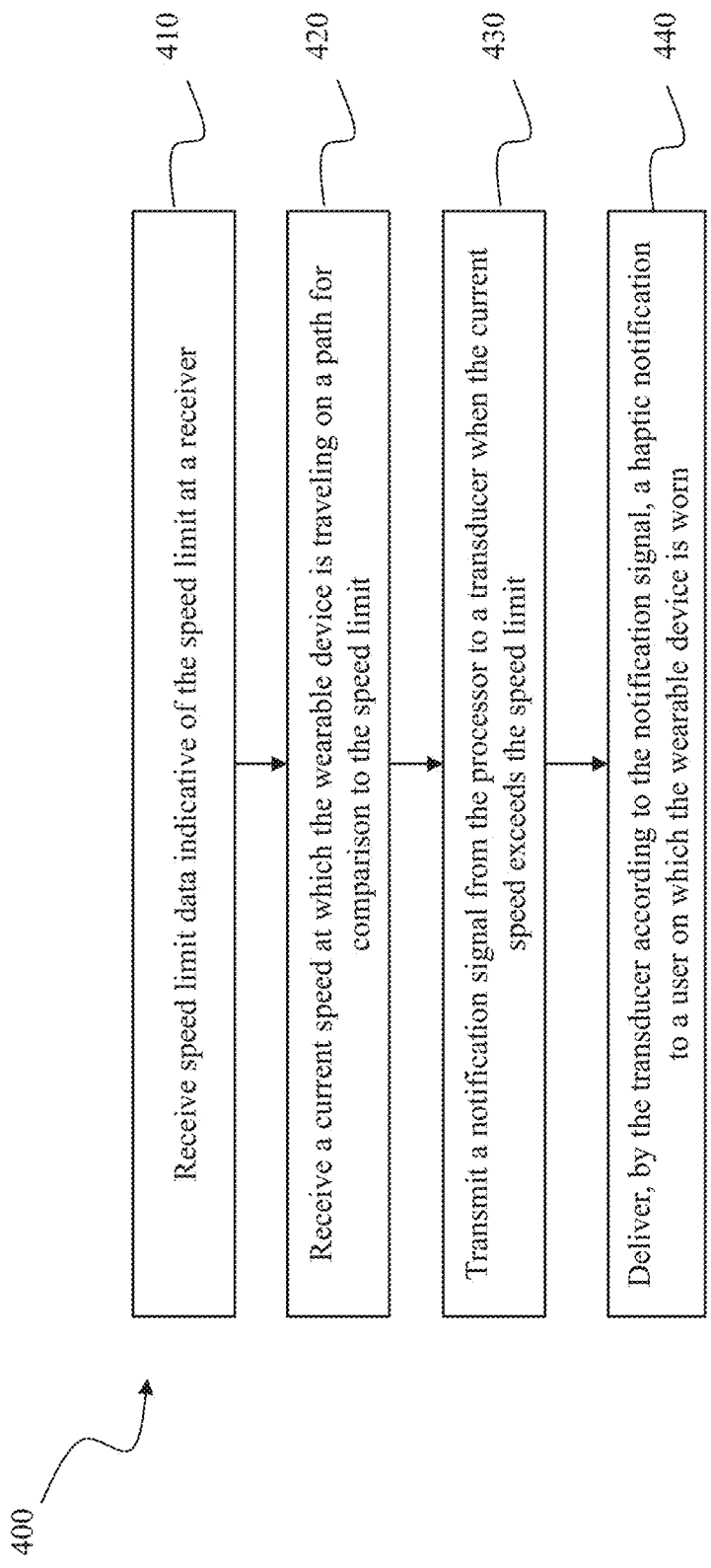
FIG. 4 depicts a flow diagram for an exemplary computer-implemented method of providing haptic notification of excessive speeds.

FIG. 4 depicts an exemplary computer-implemented method 400 of providing haptic notification of excessive speeds. At a receiving step 410, speed limit data is received at a receiver. The speed limit data is indicative of a speed limit for a path along which a wearable device is traveling. The wearable device, such as wearable device 100, shown in FIG. 1, or wearable device 200, shown in FIG. 2, may be worn by a user while traveling along the path in a vehicle. The vehicle, such as vehicle 310, shown in FIG. 3, may include an automobile.

The speed limit may be stored in a local or remote memory unit, such as in a data structure or table that stores GPS coordinates (associated with roads or highways) along with corresponding posted speed limits. A processor associated with the vehicle may retrieve the speed limit for a local memory, such as a map database that also includes posted speed limit information, or may retrieve the speed limit from a remote memory via using a transceiver and wireless communication or data transmission. For instance, the processor may transmit the vehicle's current GPS location (and/or road, e.g., Route 66) to a remote server, and the remote server may transmit the posted speed limit for that current GPS location (and/or road) in return.

At a receiving step 420, a current speed of the wearable device may be received by the processor. The current speed represents the speed of the wearable device as it travels along the path. The current speed may be received by the processor from a sensor or from a receiver, such as a GPS receiver.

The current speed may be compared to the speed limit. When the current speed exceeds the speed limit, a notification signal may be transmitted by the processor to a transducer at a transmission step 430. At a haptic notification step 440, the transducer translates the notification signal to a physical action that may be delivered to the user wearing the wearable device. The physical action may be generated by the transducer according to the notification signal received from the processor.

In certain embodiments, the physical action may vary in intensity according to the extent to which the current speed exceeds the speed limit. In certain embodiments, the current speed may be compared to a predetermined threshold above the speed limit.

Exemplary Computing System

Figure 5:
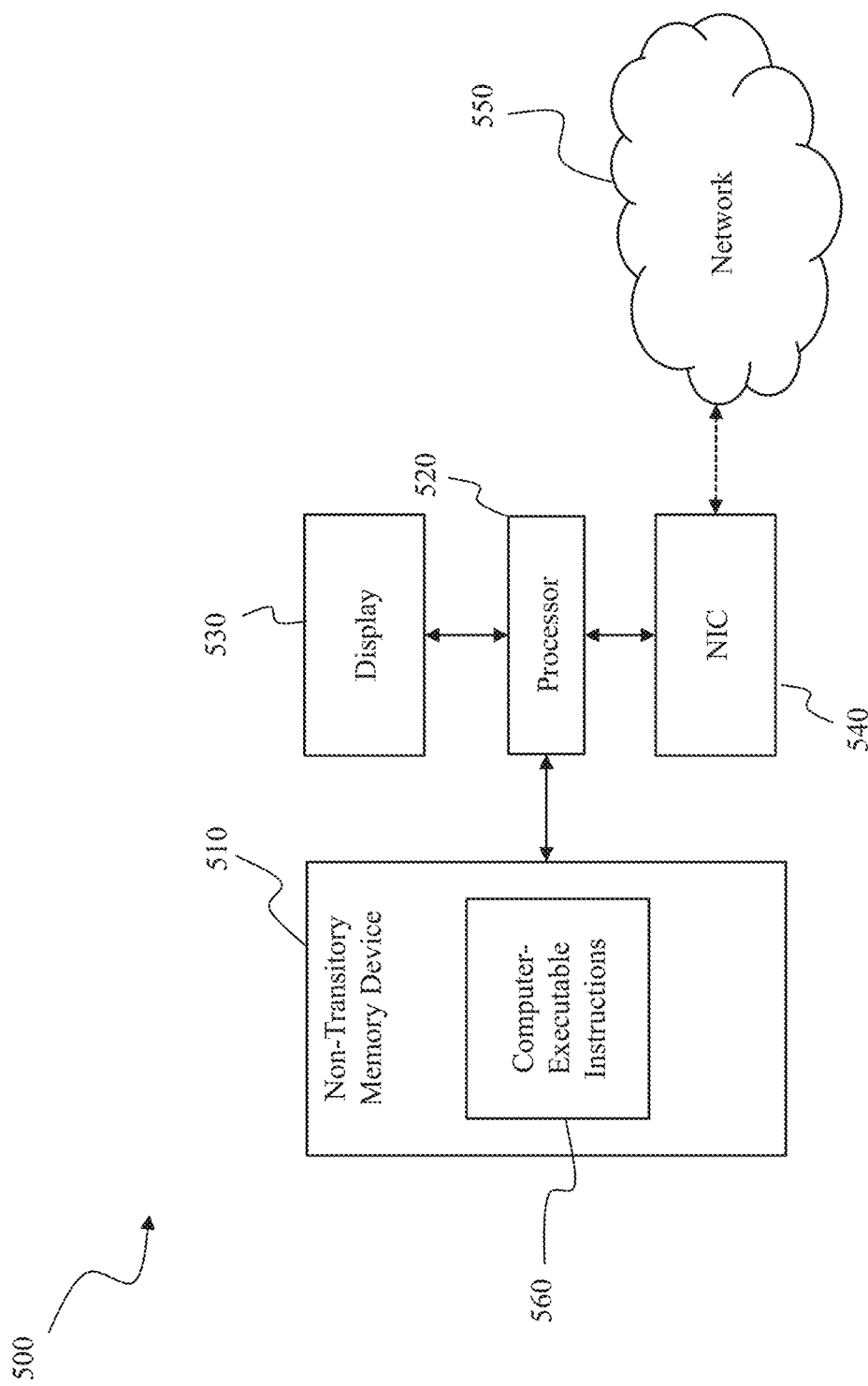
FIG. 5 depicts an exemplary computing system for providing haptic notification of excessive speeds.

FIG. 5 depicts an exemplary computing system 500 for providing haptic notification of excessive speeds to a user. Computing system 500 may be any suitable computing device, including a personal computer, server, mobile phone, smart phone, smart watch, personal digital assistant (PDA), tablet computer, wearable electronics, or laptop, for example. Computing system 500 may include non-transitory memory device 510, a processor 520, a display 530, and/or a network interface controller (NIC) 540. NIC 540 may be configured to communicably couple computing device 500 to a network 550. Non-transitory memory device 510 may be configured to store computer-executable instructions 560.

Processor 520 may be coupled to display 530 and NIC 540. Upon execution of computer-executable instructions 560, processor 520 may communicate with network 150 through NIC 140 to receive speed limit information and current speed information for the user. In certain embodiments, computing system 500 may determine the speed limit and current speed based upon signals received through NIC 140.

In certain embodiments, computing system 500 may include notification device 200, shown in FIG. 2. In such an embodiment, computing system 500 may include a sensor configured to determine current speed, such as, for example, an accelerometer. Alternatively, computing system 500 may receive speed limit data and current speed data through NIC 140 or receiver 210, shown in FIG. 2. In certain embodiments, computing system 500 may be configured to receive speed limit data from a third party service provider through NIC 140 or receiver 210.

In certain embodiments, computing system 500 may receive the speed limit data and the current speed data from a remote notification device, such as notification device 200, shown in FIG. 2. Alternatively, computing system 500 may receive the speed limit data over network 150 through NIC 140, and then relay the speed limit information to the remote notification device. In other embodiments, the speed limit information is obtained from a third party source, such as a database of speed limit information for certain roads in certain regions.

Processor 520 may further be configured to compare the current speed information to the speed limit information to determine if the user is exceeding the speed limit. In certain embodiments, processor 520 may be further configured to cause a record of excessive speeds to be stored in non-transitory memory device 510. In an alternative embodiment, such a record may be transmitted over network 550 using NIC 540, to a third party server for storage.

Upon execution of computer-executable instructions 560, processor 520 may transmit a notification signal using NIC 140 when the current speed exceeds the speed limit. The notification signal is then received by a notification device, such as notification device 200 shown in FIG. 2. Computing system 500 may include additional, less, or alternate functionality, including that discussed elsewhere herein.

Exemplary Computer-Implemented Methods

Figure 6:
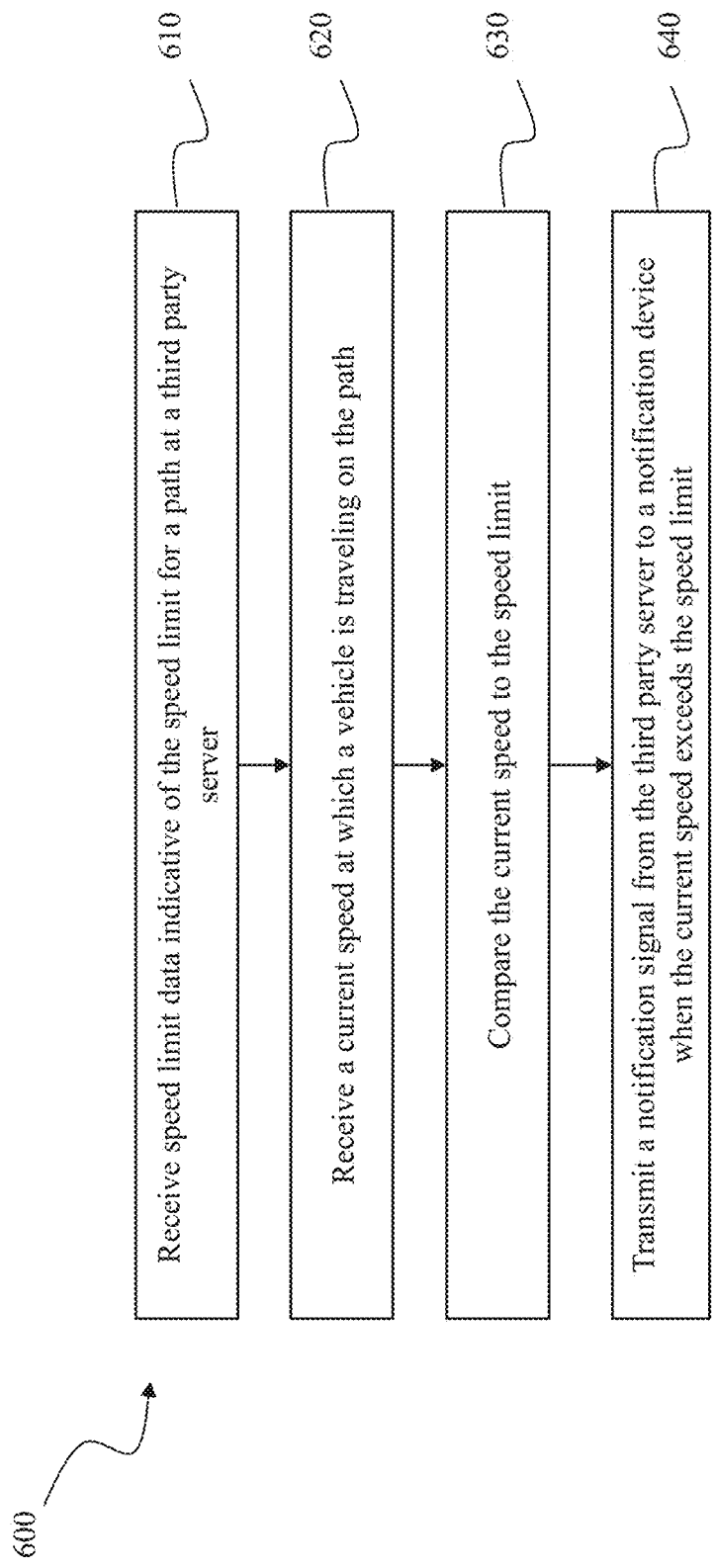
FIG. 6 depicts a flow diagram for an exemplary computer-implemented method of providing haptic notification of excessive speeds.

FIG. 6 depicts a computer-implemented method 600 of providing haptic notification of excessive speeds. At a receiving step 610, speed limit data may be received at a third party server, such as, for example, server 350, shown in FIG. 3. The speed limit data may be indicative of a speed limit for a path along which a vehicle may travel. In certain embodiments, the third party server may collect the speed limit data from various vehicles traveling the path over time, each of those vehicles observing the speed limit and transmitting the speed limit data to the third party server.

At a receiving step 620, a current speed may be received at the third party server. The current speed may be a current speed at which the vehicle is traveling along the path. The current speed may be determined by the vehicle, for example, using a speedometer. In certain embodiments, the current speed may be determined based upon a series of positions of the vehicle measured over time.

At a comparison step 630, the current speed may be compared to the speed limit. If the current speed exceeds the speed limit, a notification signal may be generated and transmitted from the third party server to a notification device at a transmit step 640. In certain embodiments, the current speed may be further compared to a predetermined threshold above the speed limit. For example, the predetermined threshold may be 10 MPH. The current speed may then be compared to the speed limit plus 10 MPH. If the current speed exceeds the speed limit by at least 10 MPH, the notification signal may be generated and transmitted from the third party server to the notification device at transmit step 640. The notification device may be configured to translate the received notification signal into a physical action, such as physical action 250, shown in FIG. 2. The physical action may include a vibration or pressure delivered to a user of the notification device who is traveling in the vehicle.

Figure 7:
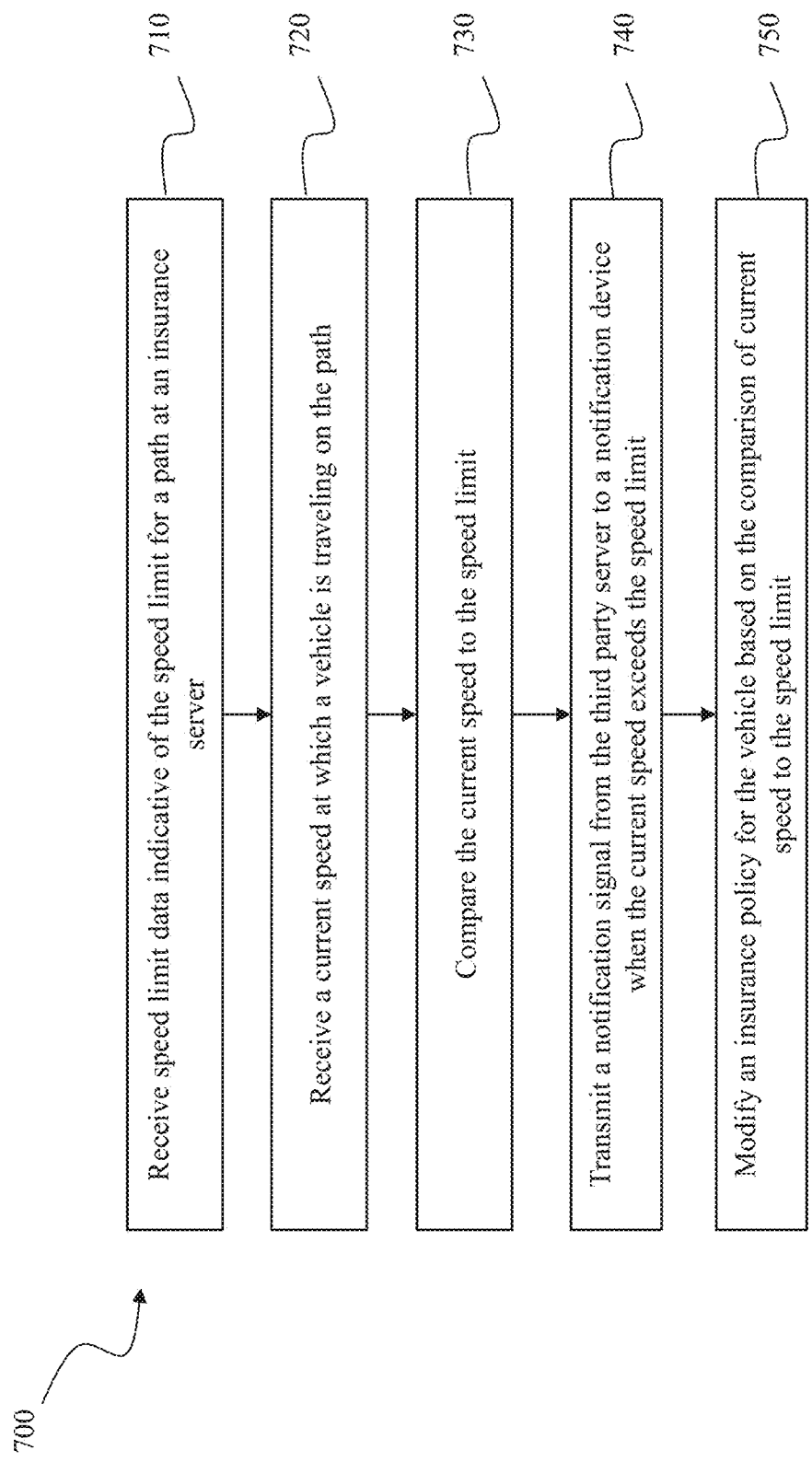
FIG. 7 depicts a flow diagram for another exemplary computer-implemented method of providing haptic notification of excessive speeds.

FIG. 7 depicts a computer-implemented method 700 of providing haptic notification of excessive speeds. At a receiving step 710, speed limit data may be received at an insurance server, such as, for example, server 350, shown in FIG. 3. The speed limit data may be indicative of a speed limit for a path along which a vehicle may travel. In certain embodiments, the insurance server may collect the speed limit data from various vehicles traveling the path over time, each of those vehicles observing the speed limit and transmitting the speed limit data to the insurance server.

At a receiving step 720, a current speed may be received at the insurance server. The current speed is a current speed at which the vehicle is traveling along the path. The current speed may be determined by the vehicle, for example, using a speedometer. In certain embodiments, the current speed may be determined based upon a series of positions of the vehicle measured over time.

At a comparison step 730, the current speed may be compared to the speed limit. If the current speed exceeds the speed limit, a notification signal may be generated and transmitted from the insurance server to a notification device at a transmit step 740. In certain embodiments, the current speed may be further compared to a predetermined threshold above the speed limit. For example, the predetermined threshold may be 10 MPH. The current speed may then be compared to the speed limit plus 10 MPH. If the current speed exceeds the speed limit by at least 10 MPH, the notification signal may be generated and transmitted from the insurance server to the notification device at transmit step 740. The notification device may be configured to translate the received notification signal into a physical action, such as physical action 250, shown in FIG. 2. The physical action may include a vibration or pressure delivered to a user of the notification device who is traveling in the vehicle.

At a policy modification step 750, the insurance server uses the comparison of the current speed and the speed limit to change various aspects of an auto insurance policy for the vehicle. For example, safe driving policy discounts may be increased if the user consistently travels below the speed limit or below some threshold above the speed limit. As a result, risk averse or safe driving may be rewarded.

Exemplary Speed Limit Warning Functionality

By using wearable technology (e.g., a smart watch), haptic feedback or vibrations may be used to inform the user when they are speeding. The frequency of the feedback and pressure applied may be more intense the more a user exceeds the limit, and/or as they slow down, the frequency/pressure/duration of the feedback diminishes until they go away all together once the user is at or below a threshold of the posted speed limit. The wearable device and/or companion mobile device may utilize hardware components (accelerometer, gyroscope, speedometer, etc.) to determine a user's current speed, and services accessed by the device may retrieve the current speed limit based upon the user's GPS location (such as from a local map or other database of posted speed limits, or via wireless communication to and from a remote server having an associated database of posted speed limits). Once the user exceeds the limit, he/she may be notified.

Additionally or alternatively to a smart watch, the foregoing functionality may be provided via a mobile device, such as a smart phone or smart phone App. The current vehicle speed may be determined from sensors mounted within the mobile device, such as accelerometers, gyroscopes, GPS units (e.g., use GPS speed), and a mobile device App may generate various speed limit related warnings—such as haptic or vibration, visual, or audible warnings.

The use of haptic or sensory feedback is preferably subtle. It may not take away from the driving experience and may not be a distraction to the driver. Rather, it may allow the driver to be notified of speeding even in the absence of physically posted speed limit signs. Additionally or alternatively to haptic feedback, audible or visual alarms may also be provided that provide notice with limited distraction to the driver. All of which may be beneficial when driving in unfamiliar areas, streets, or cities.

The present embodiments may provide for the use of haptic feedback or vibration on a wearable device to communicate speed limit information to drivers. This method of user output (sensory feedback) when incorporated together with useful speed limit information may cause drivers to be informed in a way that is not distracting but subtle. The application running on the device may be engaged to get more information (actual speed and what posted speed limit is) but this method of presenting critical speed information to users in the form of haptic touch or pressure is unique. It will encourage drivers to be more aware of speed limits, and may encourage safe driving and potentially save lives and reduce insurance claim costs.

The haptic and other warnings discussed herein may also be generated through certain areas. For instance, using GPS data, the haptic and other warnings may be generated when a vehicle is approaching or traveling through a school zone/crossing, and/or neighborhood or subdivision with children that are likely to play outside, or other area that may be defined by sets of GPS latitude and longitude coordinates. The warnings may also be generated when a vehicle is approaching areas associated with a higher than normal risk of vehicle collision—such as areas associated with a high number of previous vehicle collisions, areas with a high amount of animals crossing (e.g., deer, moose, cows, wild bores, skunks, etc.), dangerous intersections, etc.

Auto insurance customers may receive discounts on auto insurance based upon their mobile or wearable devices having installed a software application (App) associated with the speed limit warning functionality discussed herein. Also, with a customer's permission or affirmative consent, the application may monitor an amount that a customer uses the functionality, and the customer may receive a usage-based discount on auto insurance.

Exemplary Method of Providing Speed Limit Warnings

In one aspect, a computer-implemented method of providing posted speed limit warnings may be provided. The method may include (1) receiving, via one or more local or remote processors (and/or transceivers), a current speed of a vehicle (such as a speed generated by one or more vehicle-mounted sensors, wearable-device sensors, or mobile device-mounted sensors—the sensors may be accelerometers, gyroscopes, GPS receivers (using GPS speed and other information), speedometers, speed sensors, or other speed-related sensors) via wired or wireless communication either directly or indirectly from a speed-related sensor; (2) receiving, via the one or more local or remote processors (and/or transceivers), GPS location information of the vehicle and/or road or route information that the vehicle is currently traveling (such as from GPS unit mounted (i) on the vehicle, (ii) in a vehicle navigation system, or (iii) on a mobile device or wearable device); (3) determining, via the one or more local or remote processors, a posted speed limit based upon the GPS location information of the vehicle and/or the road or route information that the vehicle is currently traveling; (4) comparing, via the one or more local or remote processors, the current speed of a vehicle with the posted speed limit determined; and/or (5) if or when the current speed exceeds the posted speed limit by a predetermined threshold, generating, via the one or more local or remote processors, a haptic or other warning to the driver to slow down to facilitate safer driving and vehicle collision avoidance. The method may include additional, less, or alternate functionality, including that discussed elsewhere herein, and/or may be implemented via one or more processors and/or transceivers, and/or via computer-executable instructions stored on non-transitory computer-readable media or medium.

For instance, the warning may be a haptic vibration generated by a smart watch or other wearable electronics.

Alternatively, the warning may be a haptic vibration generated by a mobile device or smart vehicle computer.

The warning may be a haptic vibration and vary in intensity, frequency, or loudness based upon the difference between the current speed of the vehicle and the posted speed limit. The warning may be a haptic vibration and vary in intensity, frequency, or loudness based upon a type of area that the vehicle is driving through (construction area, school crossing, development with numerous small children living in the neighborhood, etc.).

Exemplary System for Providing Speed Limit Warnings

In another aspect, a computer system for providing posted speed limit warnings may be provided. The computer system may include one or more local or remote processors and/or transceivers configured to: (1) receive (or otherwise determine) a current speed of a vehicle (such as a speed generated by one or more vehicle-mounted sensors, wearable-device sensors, or mobile device-mounted sensors—the sensors may be accelerometers, gyroscopes, GPS receivers (using GPS speed and other information), speedometers, speed sensors, or other speed-related sensors) via wired or wireless communication either directly or indirectly from a speed-related sensor; (2) receive GPS location information of the vehicle and/or road or route information that the vehicle is currently traveling (such as from GPS unit mounted on the vehicle, in a vehicle navigation system, or on a mobile device or wearable device); (3) determine a posted speed limit based upon the GPS location information of the vehicle and/or the road or route information that the vehicle is currently traveling; (4) compare the current speed of a vehicle with the posted speed limit determined; and/or (5) if or when the current speed exceeds the posted speed limit by a predetermined threshold, generate a haptic or other warning to the driver to slow down to facilitate safer driving and vehicle collision avoidance. The computer system may include additional, less, or alternate functionality, including that discussed elsewhere herein.

For instance, the one or more local or remote processors may be a processor mounted on a smart watch, wearable electronics, or a mobile device. As an example, the warning may be a haptic vibration generated by a smart watch or other wearable electronics. Alternatively, the warning may be a haptic vibration generated by a mobile device or smart vehicle computer or control system.

The warning may be a haptic vibration (generated by a smart watch or mobile device, for instance) and vary in intensity, frequency, or loudness based upon the difference between the current speed of the vehicle and the posted speed limit. The warning may be a haptic vibration and vary in intensity, frequency, or loudness based upon a type of area that the vehicle is driving through (construction area, school crossing, development with numerous small children living in the neighborhood, etc.).

The computer system may be implemented within a smart watch and/or a mobile device, or a smart watch App and/or a mobile device App. The computer system may be implemented within a smart vehicle controller or vehicle navigation system, such as a vehicle navigation system that generates haptic vibrations when exceeded posted speed limits by predetermined amounts.

The one or more local or remote processors may be mounted on or within a smart watch and/or a mobile device, or execute a smart watch App and/or a mobile device App, which may be in wireless communication with one another and/or in wireless communication with a vehicle controller (such as a vehicle navigation system) and/or a remote server. Additionally or alternatively, the one or more local processors may be mounted on or within a vehicle navigation system or vehicle computer/controller.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program may be provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this patent application are not intended to be construed under 35 U.S.C. §112(f) unless traditional means-plus-function language is expressly recited, such as "means for" or "step for" language being explicitly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A wearable device, comprising:
   a receiver configured to receive speed limit data indicative of a speed limit corresponding to a path upon which the wearable device is traveling;
   a processor configured to compare the speed limit to a current speed of the wearable device; and
   a transducer configured to deliver a haptic notification to a user upon which the wearable device is worn when the current speed exceeds the speed limit, wherein an intensity of the haptic notification is a function of a difference between the speed limit and the current speed.

2. The wearable device of claim 1 further comprising a sensor configured to detect the current speed of the wearable device and provide a current speed signal indicative of the current speed to the processor.

3. The wearable device of claim 2, wherein the sensor comprises an accelerometer configured to detect the current speed of the wearable device.

4. The wearable device of claim 1, wherein the receiver is further configured to receive current speed data indicative of the current speed of the wearable device.

5. The wearable device of claim 1, wherein the transducer is further configured to deliver the haptic notification when the current speed exceeds the speed limit by a predetermined threshold.

6. The wearable device of claim 1, wherein the transducer is further configured to deliver a vibration notification to the user.

7. The wearable device of claim 1, wherein the wearable device comprises a wristwatch.

8. The wearable device of claim 1, wherein the receiver comprises a global positioning system (GPS) receiver configured to receive a GPS signal containing the speed limit data.

9. The wearable device of claim 1, wherein the receiver comprises a radio frequency (RF) receiver configured to receive a cellular signal containing the speed limit data.

10. The wearable device of claim 1, wherein the transducer is further configured to increase the intensity of the haptic notification as the current speed increasingly exceeds the speed limit.

11. The wearable device of claim 10, wherein the transducer is further configured to decrease the intensity of the haptic notification as the current speed decreasingly exceeds the speed limit.

12. A method of providing notification of exceeding a speed limit corresponding to a path upon which a notification device is traveling, the method comprising:
   receiving speed limit data indicative of the speed limit at a receiver;
   receiving, at a processor, a current speed at which the notification device is traveling upon the path for comparison to the speed limit;
   transmitting a notification signal from the processor to a transducer when the current speed exceeds the speed limit; and
   delivering, by the transducer according to the notification signal, a haptic notification to a user of the notification device, wherein an intensity of the haptic notification is a function of a difference between the seed limit and the current speed.

13. The method of claim 12, wherein receiving the speed limit data comprises receiving a global positioning system (GPS) signal containing the speed limit data.

14. The method of claim 12, wherein receiving the current speed comprises receiving a global positioning system (GPS) signal containing current speed data indicative of the current speed at the receiver.

15. The method of claim 12 further comprising:
   comparing, by the processor, the current speed to a predetermined threshold above the speed limit; and
   generating the notification signal when the current speed exceeds the predetermined threshold.

16. The method of claim 12, wherein delivering the haptic notification comprises delivering a vibration notification to the user.

17. The method of claim 12, wherein delivering the haptic notification comprises deliver a pressure notification to the user.

18. The method of claim 12, wherein delivering the haptic notification comprises increasing the intensity of the haptic notification as the current speed increasingly exceeds the speed limit.

19. The method of claim 18, wherein delivering the haptic notification comprises decreasing the intensity of the haptic notification as the current speed decreasingly exceeds the speed limit.

20. The method of claim 12, wherein receiving the speed limit data comprises receiving a cellular signal containing the speed limit data.

* * * * *